Dec. 10, 1963 W. D. ROWE 3,114,052

NOR LOGIC SWITCHING CIRCUIT HAVING SUBSTANTIALLY CONSTANT OUTPUT VOLTAGE CHARACTERISTIC

Filed March 2, 1959

WITNESSES

Leon J. Vaga

James F. Young

INVENTOR

William D. Rowe

BY R. G. Brodahl

ATTORNEY

United States Patent Office 3,114,052

Patented Dec. 10, 1963

3,114,052

NOR LOGIC SWITCHING CIRCUIT HAVING SUBSTANTIALLY CONSTANT OUTPUT VOLTAGE CHARACTERISTIC

William D. Rowe, Snyder, N.Y., assignor to Westinghouse Electric Corporation, East Pittsburgh, Pa., a corporation of Pennsylvania Filed Mar. 2, 1959, Ser. No. 796,520
2 Claims. (Cl. 307—88.5)

The present invention relates to computer logic circuitry in general and in particular to an improved NOR logic circuit for logic control systems.

In order to give a clearer concept of the present invention, a general statement of the NOR computer logic upon which the NOR logic circuit is based or designed will be made. Assuming a voltage signal to be represented by a 1 value and the absence of a voltage signal to be represented by a 0 value, then a transistor NOR circuit may be expressed logically in the binary number system. The binary number system is based on a radix of 2 instead of the radix of 10 as is the decimal system, therefore, only two numbers namely 0 and 1 are required to form the combinations to represent all numbers.

In the operation of a NOR logic circuit, the output circuit or circuits will have a 1 value signal only if neither a first of its input circuits nor a second input circuit nor each of the remaining input circuits has a 1 value signal applied thereto. The key word in the above statement is the word nor, which expresses both a logic operation and negation. Therefore, this logic circuit is termed a NOR circuit and the computer logic it performs is called NOR logic.

The more common approaches to the construction of high speed computers and logic systems in the past have been initially to go from serial to parallel circuitry and then subsequently to use faster and faster components to increase the operational speed of the circuitry. High speed components have reached the state where we are now talking about switching times in the order of the light foot. This is a theoretical limit imposed by the velocity of light and shows that we are rapidly approaching the limits of switching speed. It is, therefore, desirable that we re-examine the utilization of logic techniques to determine if there are not other means of obtaining high speed computer operations which will minimize the need for extremely fast components.

One solution of the above problem is the use of what has been termed parallel-parallel logic. With a logic circuit that has effectively an unlimited or infinite number of inputs and an infinite number of outputs, and if all input signals and their complements are available, logic arrays can be constructed using only two levels of logic circuits. The advantage of this circuit arrangement lies in the fact that the complete operational time of a computer constructed in this manner consists of only the propagation times of these two logic circuits. This means that the maximum speed of a computer array is only one-half as fast as the maximum operating speed of a single logic component.

The NOR logic circuit provides several inherent advantages, such as only one type of circuit is required for the entire computer device so only a single propagation constant is thereby provided. Another advantage is that in accordance with the present invention it is feasible to build NOR logic circuits with numbers of inputs and outputs that are quite large, in the order of 25 to 30 inputs and outputs. This number of input circuits and output circuits effectively appears to be infinite for a great many practical applications of the computer device.

It is an object of the present invention to provide a more reliable and improved logic circuit capable of operation with a greater number of input circuits and capable of driving a greater number of output circuits.

It is a different object of the present invention to provide an improved logic circuit having a substantially constant output voltage characteristic regardless of the output loading caused by a larger number of output circuits driven by said logic circuit up to a predetermined and greater number of output circuits.

It is another object of the present invention to provide a logic circuit including an improved substantially constant voltage source device and logic switching device to provide a logic circuit capable of operation with a larger number of input circuits and a larger number of output circuits.

It is a further object of the present invention to provide an improved logic circuit capable of operation with a larger plurality of inputs and a larger plurality of outputs with less power dissipation in the logic circuit and requiring lower power supply voltages for the operation of the logic circuit.

These and other objects of the invention will become apparent from the following description taken in conjunction with the accompanying drawings, wherein.

Figure 1:
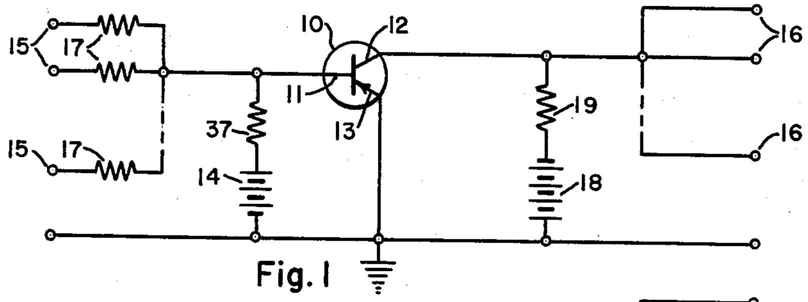
FIGURE 1 shows a NOR logic circuit.

In FIG. 1 there is shown a NOR logic circuit comprising a transistor 10 having three operation controlling elements, a base element 11, a collector element 12, and an emitter element 13. In this particular embodiment, a p-n-p transistor device is shown. However, it should be understood that an n-p-n transistor device could also be utilized by reversing the polarity of the bias and signal voltages. Further both germanium and silicon transistors have been employed in this regard with success. The transistor 10 is to be used in a switching mode, that is, an input signal of sufficient magnitude when applied between two of its electrodes or operational controlling elements 11 and 13 will drive the transistor into its saturated operating condition. A supply voltage is connected between a third element 12 and one of said two controlling elements, namely the base element 11.

The p-n-p transistor 10 is provided with a base element 11 and an emitter element 13 between which said input signal is applied to cause the transistor 10 to be driven into its saturated operating condition. A 24 volt bias voltage source 14 is connected between the emitter element 13 and the base element 11 to cause the transistor 10 to operate in its unsaturated operating condition when no input signal is applied through any of the plurality of inputs 15. The logic circuit, shown in FIG. 1, is provided with a plurality of output circuits 16 to which additional and similar logic circuits or other load devices may be connected relative to ground potential. The collector element 12 is connected to the output circuits 16. A resistor member 17 is connected between each of the input terminals 15 and the base element 11. A 250 volt power source 18 is connected through an impedance member 19 between the emitter element 13 and the collector element 12. The power source 18 is operative to supply a bias voltage on the collector element 12, such that a unit value negative output signal is supplied through each of the output terminals 16 when the transistor device 10 is operating in its unsaturated condition and a zero value or substantially ground level output signal is provided to each of the terminals 16 when the transistor device 10 is operating in its saturated condition.

The logic circuit shown in FIG. 1 is operative such that a unit value negative input signal or voltage on any one of the input terminals or circuits 15 is operative to cause the transistor device 10 to saturate, and a ground potential or zero valve output signal is supplied to the output terminals 16. The absence of the negative input voltage or signal on any one of the input terminals 15 causes the positive bias voltage from the voltage source 14 to maintain the transistor device 10 in its cutoff or unsaturated operating condition. Under the latter cutoff condition, the transistor device 10 is operative in a very high impedance state, such that the output terminals 16 see a unit value negative voltage equal to and in accordance with the following:

$$\text{Output voltage } V16 = V18\left(\frac{R17}{XR19+R17}\right)$$

The output voltage V16 equals the voltage V18 of the power source 18 times the quantity R17 where R17 is the resistance value of the resistance member 17 connected in series between each input terminal and the base element 11, and divided by a quantity X times the resistance value R19 of the resistor member 19 plus the resistance value R17 of the resistor member 17 in series with the input terminal, where X is the number of outputs circuits 16 actually connected to the input circuits 15 of other NOR logic circuits. In this regard, it should be understood that only one NOR input circuit is driven by one NOR output circuit. The above equation shows that the output voltage V16 is reduced as more input circuits of succeeding NOR logic circuits are connected to the output circuits of any particular NOR circuit under consideration.

Figure 2:
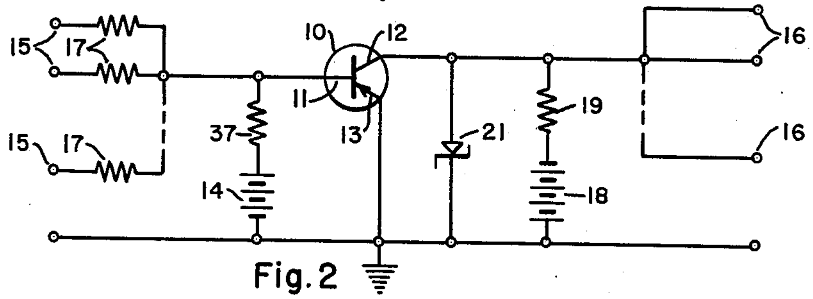
FIG. 2 shows a modification of the NOR logic circuit shown in FIG. 1.

Since all input circuits are resistive, and most of the logic is accomplished in the input network, only a relatively small number of transistor members are required as compared to the number of resistor members. This is certainly desirable as most of the logic is thereby accomplished by the wiring interconnections and resistors which can be inexpensive, reliable and miniaturized elements. For extreme reliability of operation, the NOR logic circuit, as shown in FIG. 1, has a practical maximum number of input circuits of six and a practical maximum number of output circuits of six. In order to increase the usable number of input circuits and the usable number of output circuits of the logic circuit arrangement to a larger number the basic NOR logic circuit as shown in FIG. 1 can be modified as shown in FIG. 2, such that the output voltage remains at substantially power supply potential for a larger output loading. This allows the logic circuit to drive more output circuits than the logic circuit arrangement as shown in FIG. 1.

In FIG. 2, there is shown a 24 volt breakdown Zener diode 21 connected between the collector element 12 and the emitter element 13 of the transistor device 10, such that the output voltage V16 cannot fall below 24 volts when the transistor device is in its cutoff or unsaturated operating condition, and the output circuit loading is restricted to never exceed a condition where the output voltage will fall below this value. Under this condition of operation, the current derived by the power source 18 acting through the resistor member 19 is shunted between the output terminals 16 and the Zener diode 21. One disadvantage of the circuit arrangement as shown in FIG. 2 is the high power dissipation due to the 250 volt power supply 18 acting through the resistor member 19.

Figure 3:
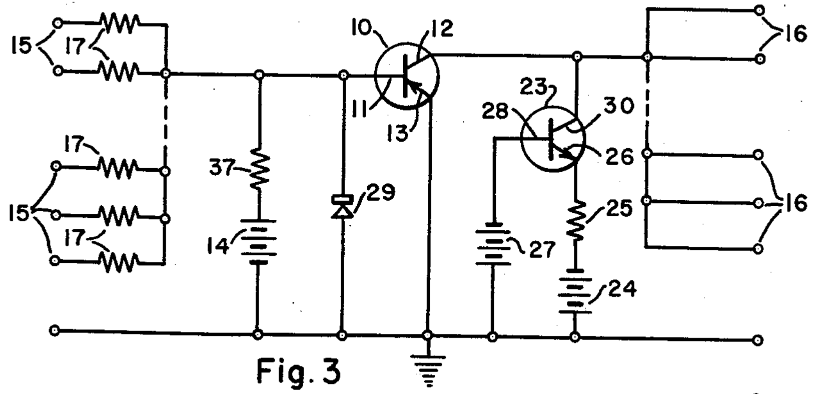
FIG. 3 shows an improved NOR logic circuit in accordance with the present invention.

In FIG. 3, there is shown a modified NOR logic circuit in accordance with the present invention, wherein a transistor device 23 is employed as a constant voltage source. The transistor device 10 is still the basic logic switching device and the transistor device 23 is operative as a constant voltage source relative to the collector-emitter circuit of the transistor device 10 and the output signal supplied to the output terminals 16. In the circuit arrangement as shown in FIG. 3, a substantially constant emitter current for the transistor 23 is derived by the constant voltage difference between the bias voltage supplied by the voltage source 24 of the order of 20 volts, connected through the impedance member 25 to the emitter element 26 of the transistor device 23 relative to the bias voltage source 27 of the order of 15 volts, which voltage difference is effectively acting across the emitter resistor or impedance member 25. This maintains the maximum collector current of the transistor device 23 to be in accordance with the following formula:

$$I_c \text{ max.} = \left(\frac{V24-V27}{R25}\right)A$$

where V24 is greater than V27 and the quantity A is the current gain of the transistor device 23. Below this value a range of substantially constant potential exists. The power dissipation of the NOR logic circuit as shown in FIG. 3, is materially less than the power dissipation of the NOR logic circuit as shown in FIGS. 1 and 2.

A silicon diode member 29 may be provided in the forward direction between the base element 11 and ground potential to prevent the base element 11 from being overloaded when a plurality of input circuits 15 having 1 or unit value control signals applied thereto are connected to the base element 11. This connection makes use of the high forward voltage drop of silicon diodes. The logic circuit as shown in FIG. 3 has been actually tested, using micro-alloy diffused base transistor devices and is operative with a simultaneous connection of 25 input circuits and 25 output circuits, and with an average propagation time in the order of 80 millimicroseconds.

Figure 4:
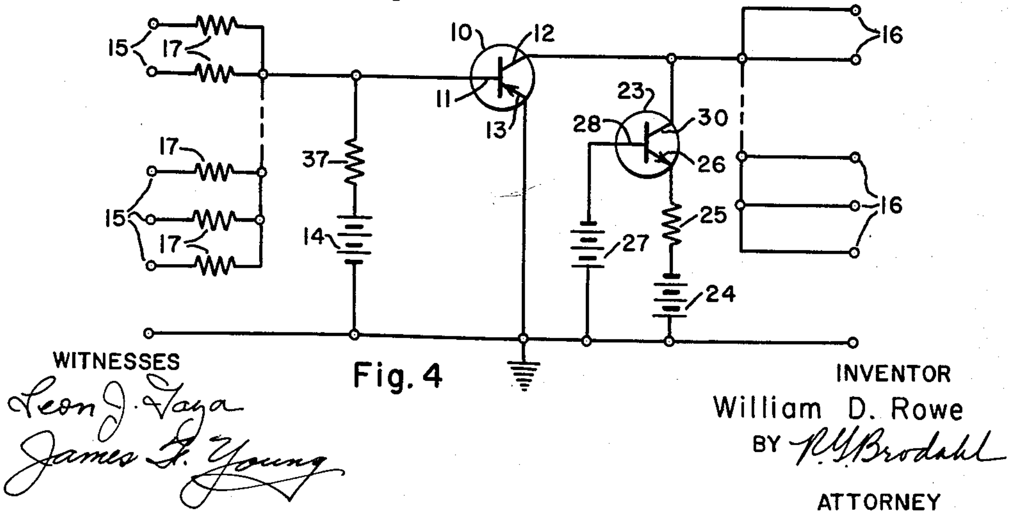
FIG. 4 shows a modification of the improved NOR logic circuit in accordance with the present invention.

The logic circuit arrangement as shown in FIG. 4 is similar to that shown in FIG. 3 with the removal of the silicon diode member 29.

The NOR logic circuits as shown in FIGS. 1 and 2 require the relatively high voltage power source 18 in the order of 250 volts connected across the resistor member 19 to provide the desired operation of the transistor device 10. The power dissipation due to the logic circuit arrangement, as shown in FIGS. 1 and 2, is relatively high, in the order of 5 to 10 watts. Furthermore, practical operating conditions of the logic circuit could occur such that the current through the transistor device 10 would not be limited sufficiently to prevent destroying the transistor device 10.

The NOR logic circuits, as shown in FIGS. 3 and 4, operate with a larger plurality of input circuits and output circuits without excessively high power dissipation and in addition lower power supply voltages are required for operating the logic circuit. The constant current source transistor device 23 dissipates only one or two watts in its actual operation. As shown in FIGS. 3 and 4, it is connected in a grounded base configuration. The power source 27 is operative through the base element 28 and the collector element 30 of the transistor device 23 to supply the necessary current for the transistor device 10 through an effective very high impedance. This constant current is maintained in the collector element-base element circuit of the transistor device 23 by introduction of a control current to the transistor device 23 through the emitter element 26 and base element 28 circuit of the transistor device 23. This latter control current in the emitter-base circuit of the transistor device 23, which is at a substantially low impedance, causes the gain characteristic A times itself to appear in the base-collector circuit of the transistor device 23. Since the latter base-collector circuit of the transistor device 23 is a high impedance circuit and the alpha gain characteristic is very close to unity, a substantially constant current flows to the transistor device 10 of the NOR logic circuit. Since lower voltages and low resistances are employed in the power dissipation circuit, the actual power dissipation is quite low and divided between the transistor device 23 and the current regulating resistor member 25 in the emitter circuit of the transistor device 23.

In FIG. 4, a NOR logic circuit similar to that shown in FIG. 3 is provided, however, the Zener diode voltage regulator 29 has been omitted. The logic circuit arrangement of FIG. 4 will operate in substantially the same manner as the logic circuit arrangement shown in FIG. 3, with the exception that the voltage regulation of the output voltage V16 is not controlled as well.

The NOR logic circuits as shown in FIGS. 3 and 4 are particularly suitable for building a computer device employing logic circuits having a large multiplicity of input and output circuits. The NOR logic circuit shown in FIGS. 3 and 4 allows the construction of a parallel-parallel logic computer device, which allows all logic operations to be done on two levels of NOR logic circuits such that only two propagation times, as far as frequency response is connected, are required. This will enable logic circuits to be built whose speed of operation is faster than any known logic circuit arrangement of the prior art.

The present invention is related to the invention covered by copending application SN 628,332 filed December 14, 1956, entitled NOR Elements for Control Systems and assigned to the same assignee as the present application.

Although the present invention has been described with a certain degree of particularity, it should be understood that the present disclosure has been made only by way of example, and that numerous changes in the details of construction and the combination and arrangement of parts may be resorted to without departing from the scope and spirit of the present invention.

The following component values have been actually employed in the NOR logic circuit in accordance with the present invention:

| | | |
|---|---|---|
| Transistor 10 type | | 2N501 |
| Transistor 23 type | | 2N102 |
| Resistor 17 | ohms | 15,000 |
| Resistor 37 | do | 62,000 |
| Resistor 25 | do | 250 |
| V14 | volts | 24 |
| V27 | do | 15 |
| V24 | do | 20 |

I claim as my invention:

1. In an electrical switching apparatus operative with at least one input circuit and at least one output circuit, the combination of a first transistor device having base, emitter and collector elements, a second transistor device having base, emitter and collector elements, a first voltage supply connected between the base and emitter elements of said first transistor device for biasing said first transistor device to its unsaturated operating condition, a second voltage supply connected in a series control circuit including said emitter and collector elements of the first transistor device and the emitter and collector elements of the second transistor device, said switching apparatus being operative to provide a first substantially constant voltage output signal when said first transistor device is operating in its unsaturated condition and for providing a second substantially constant voltage output signal when said first transistor device is operating in its saturated condition, a third voltage supply connected between the base element of said second transistor device and the emitter element of said first transistor device for controlling the operation of said second transistor device as a substantially constant voltage providing device, with said second transistor device being operative to provide a substantially constant current flow in said control circuit as determined by said third voltage supply with the base element of the first transistor device being connected to said input circuit for receiving an input signal that may be present on said input circuit for causing said first transistor device to operate in its saturated condition, and with said output circuit being connected to the collector element of said first transistor device for receiving one of said first and second output signals.

2. In an electrical switching apparatus operative with a plurality of input circuits and a plurality of output circuits, the combination of a first transistor device having base, emitter and collector elements, a second transistor device having base, emitter and collector elements, a first voltage supply connected between the base and emitter elements of said first transistor device for biasing said first transistor device to its unsaturated operating condition, a second voltage supply connected in a series control circuit including said emitter and collector elements of the first transistor device and the emitter and collector elements of the second transistor device, said switching apparatus being operative to provide a first substantially constant voltage output signal when said first transistor device is operating in its unsaturated condition and for providing a second substantially constant voltage output signal when said first transistor device is operating in its saturated condition, a third voltage supply connected between the base element of said second transistor device and the emitter element of said first transistor device for controlling the operation of said second transistor device as a substantially constant voltage providing device, with said second transistor device being operative to provide a substantially constant current flow in said control circuit as determined by said third voltage supply with the base element of the first transistor device being connected to said input circuits for receiving an input signal that may be present on any one of said input circuits for causing said first transistor device to operate in its saturated condition, and with said output circuits being connected to the collector element of said first transistor device for receiving one of said first and second output signals.

References Cited in the file of this patent

UNITED STATES PATENTS

| | | |
|---|---|---|
| 2,209,199 | Gray | July 23, 1940 |
| 2,730,576 | Caruthers | Jan. 10, 1956 |
| 2,776,382 | Jensen | Jan. 1, 1957 |
| 2,878,398 | Peterson | Mar. 17, 1959 |
| 2,891,172 | Bruce et al. | June 16, 1959 |
| 2,964,653 | Cagle | Dec. 13, 1960 |